A. A. HENDERSON.
Harvester.
No. 29,594. Patented Aug. 14, 1860.
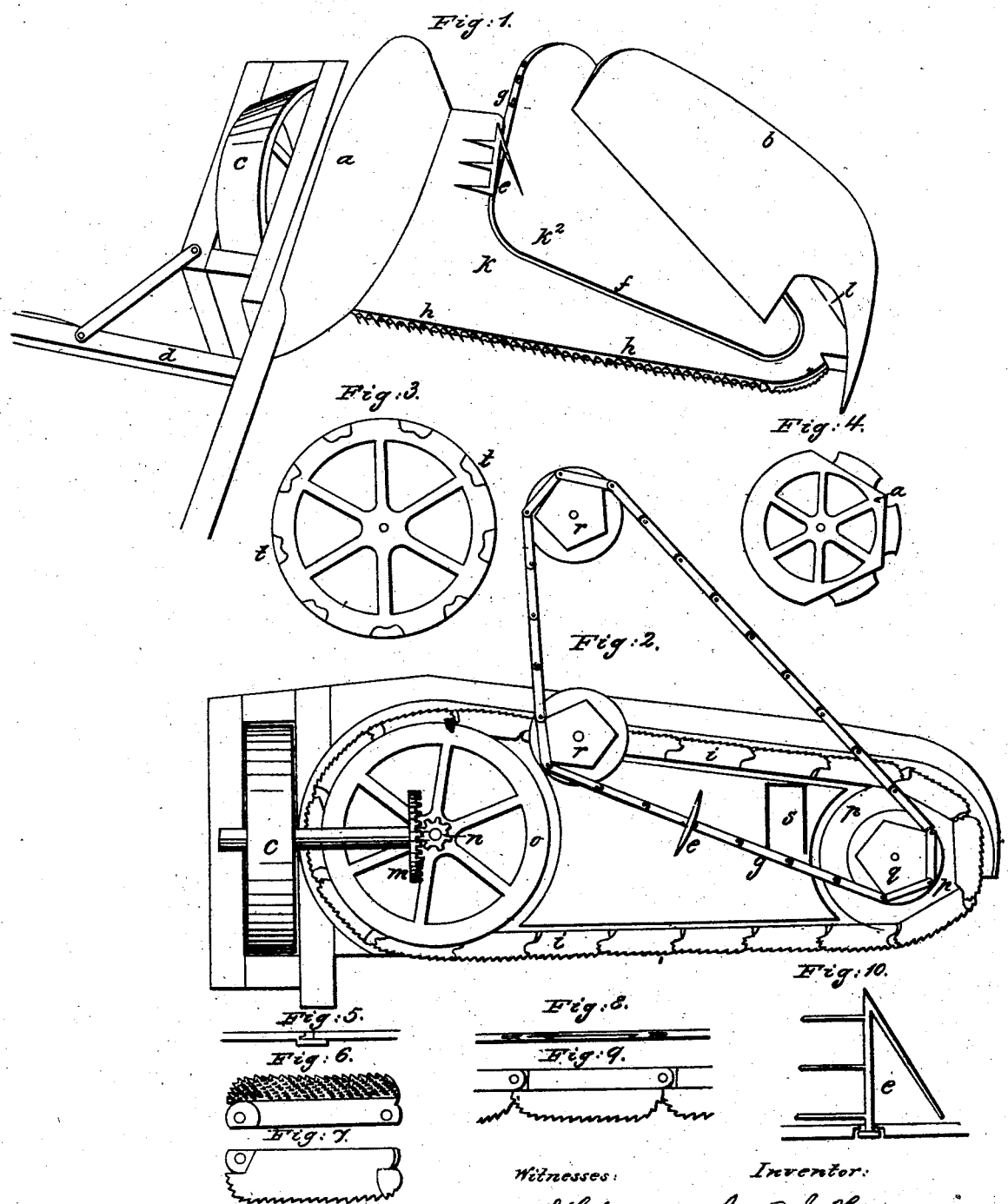

UNITED STATES PATENT OFFICE.

ANDREW A. HENDERSON, OF THE UNITED STATES NAVY.

IMPROVEMENT IN MACHINES FOR REAPING AND RAKING GRAIN AND MOWING GRASS.

Specification forming part of Letters Patent No. 29,594, dated August 14, 1860.

*To all whom it may concern:*

Be it known that I, ANDREW A. HENDERSON, passed assistant surgeon of the Navy of the United States, of the county of Huntingdon and State of Pennsylvania, have invented a new and useful Machine for Reaping and Raking Grain and Mowing Grass; and I do hereby declare that the following is a full, clear, and exact description of the same.

Figure 1 is a perspective view of the machine from the front. $a\ b$ are the side-boards; $c$, the outer wheel or truck on which the machine runs; $d$, the shafts; $e$, rake; $f$, slit through which the rake works; $g$, endless chain giving motion to rake; $h$, fixed teeth above the sickle; $i$, sickle working beneath; $k$ and $k^2$, bed receiving grain; $l$, opening through which the rake returns.

Fig. 2 represents the machine with the bed on which the grain falls, the fixed teeth and the side-boards removed; $c$, outer truck; $l$, rake; $g$, endless chain for rake; $i$, chain sickle or saw; $m$, cog-wheel on axle of outer truck; $n$, cog-wheel on $o$; $o$, horizontal flanged wheel which gives motion to sickle; $p$, horizontal wheel with flanges around which the sickle passes; $q$, wheel on the axle of $p$, giving motion to rake-chain; $r\ r$, wheels around which the rake-chain passes; $s$, inner detached truck on which the machine moves.

Fig. 3 shows the under side of the wheel moving the sickles, ($o$, Fig. 2;) $t$, notches in inferior flange taking hold of projections at joint of sickles.

Fig. 4 shows the upper surface of inner flanged wheel, ($p$, Fig. 2;) a partial removal of upper flange to allow sickles to be unshackled. Fig. 5 shows the mode of interlocking sickles; Fig. 6, under surface of one sickle; Fig. 7, upper surface of one sickle; Figs. 8 and 9, a form of saw in which the blade can be inserted into a riveted chain, after the fashion of a tenon-saw; Fig. 10, the rake with three horizontal prongs on one side and an obliquely-descending one on the other.

My invention consists in an apparatus for raking the grain from the machine at intervals and in such quantities as will form a sheaf, which it deposits so far from the standing grain as not to be in the way of the machine on its return to the same part of the field.

It consists of a rake of three or more horizontal prongs on one side and an obliquely-descending one on the other, ($e$, Figs. 1 and 2, Fig. 10,) fixed uprightly in an endless chain, ($g$, Figs. 1 and 2,) which crosses the bed on which the grain falls, presses it against the outer side-board, $a$, Fig. 1, and the horizontal prongs, entering the straw, after the fashion of a pitchfork, carry it backward clear of the machine.

The rake-chain being under cover, the rake works through a slit, $f$, Fig. 1, and returns behind and under cover of the inner side-board, $b$, Fig. 1, through an opening, $l$, in the same. The rake-chain is kept in place by and moves around three horizontal wooden wheels, $q\ r\ r$, Fig. 2. It is of wood in long links. The motion is derived from the wheel $q$, Fig. 2. The wheels $r\ r$ are attached to a triangular part of the bed, which, with the raking apparatus and inner side-board, will be removed in mowing, a similar triangular piece replacing it. The machine runs upon an inner small detached truck, $s$, Fig. 2, and an outer and larger one, which imparts motion to the cutting and raking apparatus when the machine is drawn forward by one or more horses. The sickles in the model represent links of eight inches in length, and from this has in working around its wheels a vibration backward and forward of near an inch as every link passes, together with its continued motion, and the edge therefore, with the oblique fixed teeth, operates like scissors as well as a saw. From the continuous motion of the sickle it will not be so apt to clog as in machines with a reciprocating motion, and the extent of the cutting-edge will require it to be sharpened less frequently. The shafts or tongue are attached to the frame supporting the axle of the larger truck.

What I claim as my invention, and desire to secure by Letters Patent, is—

The combination of the rake $e$ and horizontally-traveling endless belt or chain, to which it is attached, with the platform $k$, and sideboards $a\ b$, or their equivalents, substantially as described, for discharging the grain in gavels at intervals.

ANDREW A. HENDERSON.

Witnesses:
NATHL. D. MILLER,
JACOB G. CROCKETT.